US011616798B2

(12) United States Patent
Achleitner et al.

(10) Patent No.: US 11,616,798 B2
(45) Date of Patent: Mar. 28, 2023

(54) MALICIOUS TRAFFIC DETECTION WITH ANOMALY DETECTION MODELING

(71) Applicant: Palo Alto Networks, Inc., Santa Clara, CA (US)

(72) Inventors: Stefan Achleitner, San Jose, CA (US); Chengcheng Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 176 days.

(21) Appl. No.: 16/999,865

(22) Filed: Aug. 21, 2020

(65) Prior Publication Data
US 2022/0060491 A1 Feb. 24, 2022

(51) Int. Cl.
*H04L 9/40* (2022.01)
(52) U.S. Cl.
CPC ...... *H04L 63/1425* (2013.01); *H04L 63/1416* (2013.01)
(58) Field of Classification Search
CPC ................ H04L 63/1425; H04L 63/1416
USPC ............................................. 726/23
See application file for complete search history.

(56) References Cited

U.S. PATENT DOCUMENTS

| | | | |
|---|---|---|---|
| 9,288,220 B2 * | 3/2016 | Raugas | H04L 63/145 |
| 10,091,231 B1 * | 10/2018 | Gates | H04L 63/1425 |
| 10,931,687 B2 * | 2/2021 | Mestha | H04L 63/1466 |
| 11,070,572 B2 * | 7/2021 | Wosotowsky | H04L 63/1416 |
| 2014/0165201 A1 * | 6/2014 | Wittenschlaeger | G06F 21/552 726/23 |
| 2015/0106931 A1 * | 4/2015 | Mankin | H04L 63/145 726/23 |
| 2016/0226894 A1 * | 8/2016 | Lee | G06N 20/00 |
| 2017/0134404 A1 * | 5/2017 | Machlica | H04L 63/1416 |
| 2017/0318034 A1 * | 11/2017 | Holland | H04W 12/126 |
| 2018/0159879 A1 * | 6/2018 | Mestha | G06N 3/0454 |
| 2018/0268142 A1 * | 9/2018 | Sethumadhavan | G06N 20/00 |
| 2019/0230099 A1 * | 7/2019 | Mestha | H04L 63/1416 |
| 2020/0053112 A1 * | 2/2020 | Torisaki | H04L 12/40 |
| 2020/0285737 A1 * | 9/2020 | Kraus | G06F 21/552 |
| 2020/0287920 A1 * | 9/2020 | Mandrychenko | H04L 67/5651 |
| 2020/0322366 A1 * | 10/2020 | Yan | G06N 3/0472 |
| 2020/0358819 A1 * | 11/2020 | Bowditch | G06K 9/6267 |

(Continued)

OTHER PUBLICATIONS

Boukhtouta, et al., "Towards Fingerprinting Malicious Traffic", Procedia Computer Science 19 (2013) 548-555.

(Continued)

*Primary Examiner* — Badri Narayanan
(74) *Attorney, Agent, or Firm* — Gilliam IP PLLC

(57) ABSTRACT

An anomaly detection model is trained to detect malicious traffic sessions with a low rate of false positives. A sample feature extractor extracts tokens corresponding to human-readable substrings of incoming unstructured payloads in a traffic session. The tokens are correlated with a list of malicious traffic features and frequent malicious traffic features across the traffic session are aggregated into a feature vector of malicious traffic feature frequencies. An anomaly detection model trained on feature vectors for unstructured malicious traffic samples predicts the traffic session as malicious or unclassified. The anomaly detection model is trained and updated based on its' ongoing false positive rate and malicious traffic features in the list of malicious traffic features that result in a high false positive rate are removed.

20 Claims, 9 Drawing Sheets

(56) References Cited

U.S. PATENT DOCUMENTS

2021/0141897 A1* 5/2021 Seifert ................ H04L 63/1408
2021/0185066 A1* 6/2021 Shah .................... G06N 3/0445
2022/0014554 A1* 1/2022 Vasu ....................... H04L 63/20

OTHER PUBLICATIONS

Rossow, et al., "Sandnet: Network Traffic Analysis of Malicious Software", BADGERS 2011 Workshop on Building Analysis Datasets and Gathering Experience Returns for Security, Salzburg, 11 pages.
Sofka, "Learning Detectors of Malicious Network Traffic", [online] retrieved on Jul. 26, 2020 from https://msofka.github.io/projects/malware/, 2018, 9 pages.
Wang, et al., "Anomalous Payload-based Network Intrusion Detection", In Recent Advance in Intrusion Detection (RAID), Sep. 2004., 20 pages.

* cited by examiner

US 11,616,798 B2

MALICIOUS TRAFFIC DETECTION WITH ANOMALY DETECTION MODELING

BACKGROUND

The disclosure generally relates to information security and monitoring or scanning of software or data including attack prevention.

Anomaly detection models are a class of models that are trained to classify data points "normal" or "non-anomalous" while identifying every other data point as an outlier or anomaly. The anomaly detection models learn a region corresponding to normal behavior for the data points. Data points outside a boundary of this region are classified as anomalous. Common models include clustering, one-class support vector machines (SVMs), hidden Markov models, long short-term memory networks, and Bayesian networks, among others. Supervised anomaly detection models can use a data set of normal or non-anomalous data during training.

BRIEF DESCRIPTION OF THE DRAWINGS

Aspects of the disclosure may be better understood by referencing the accompanying drawings.

DESCRIPTION

Figure 1:
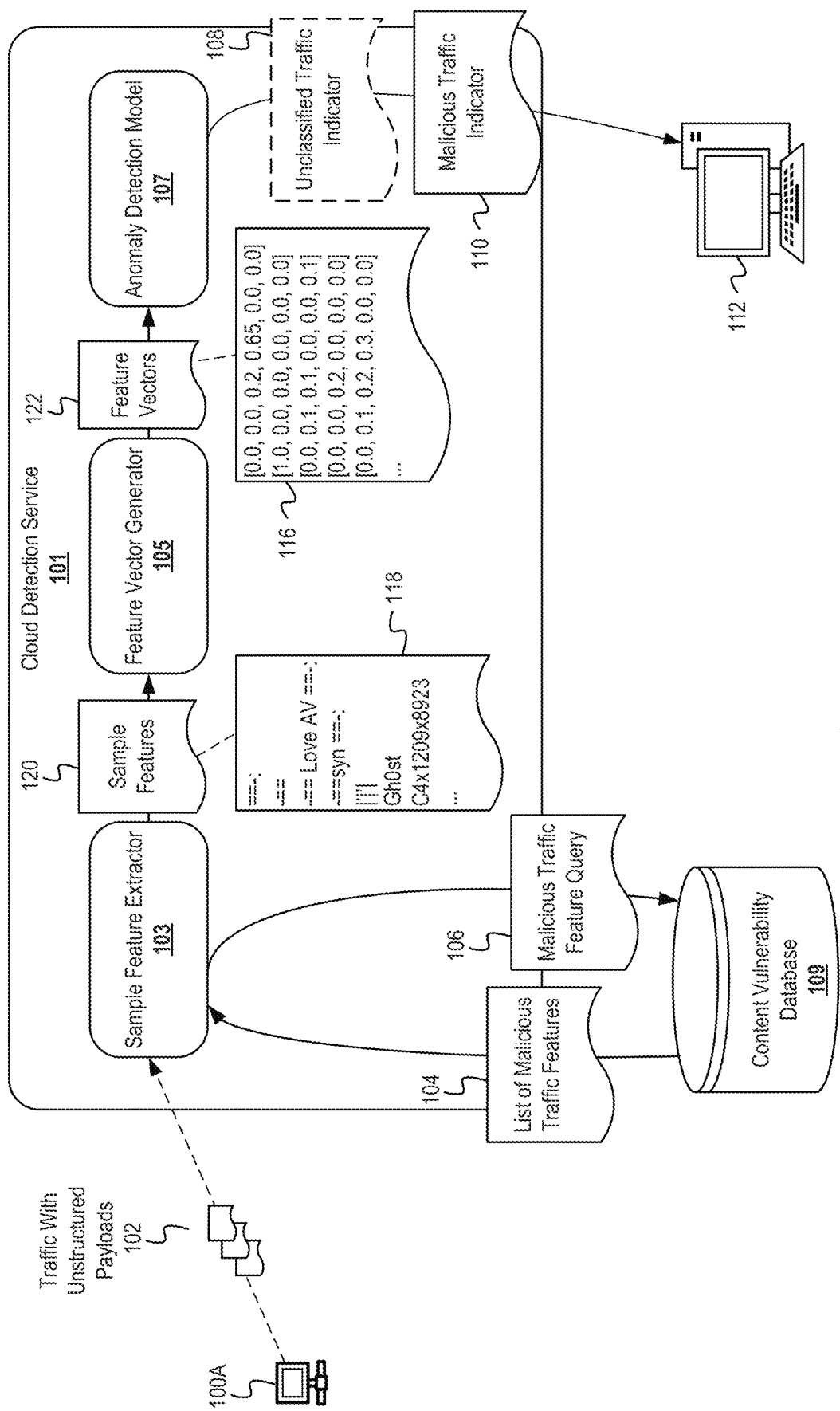
FIG. 1 is a schematic diagram of a cloud detection service for detecting malicious traffic in unstructured payloads.

The description that follows includes example systems, methods, techniques, and program flows that embody aspects of the disclosure. However, it is understood that this disclosure may be practiced without these specific details. For instance, this disclosure refers to detecting malicious traffic using anomaly detection models trained on a data set of malicious traffic features in illustrative examples. In other instances, well-known instruction instances, protocols, structures, and techniques have not been shown in detail in order not to obfuscate the description.

Overview

Malicious network traffic can take different forms. Generally, malicious network traffic can be network traffic that carries malicious software (malware) to be installed/run on an endpoint device or can be an attack itself (e.g., port scanning, malicious hypertext transfer protocol (HTTP) GET/POST requests, etc.). Regardless of the particular threat, unstructured payloads in network traffic pose a challenge for malicious traffic detection. The payloads are considered as lacking structure since there is no specified format, predefined schema, or pre-defined structure for the payload. The content, length, etc. can vary across payloads in a network session (e.g., a transmission control protocol (TCP) session). Without a priori knowledge of structure, searching and pattern detection for security analysis are challenging. In particular, a network session with payloads for carrying out an unknown or zero-day attack is likely not detected as malicious. Attacks can include malware command and control attacks. After an attacker infects an endpoint in a network, the command and control server sends instructions to the compromised endpoint (e.g., instructions to carry out a denial-of-service attack or transmit confidential information). The commands or instructions will be in the payloads. Obtaining a dataset for model training and testing to recognize legitimate/benign network traffic is difficult at least because of the variety of unstructured payloads.

The malicious traffic detection technology disclosed herein can detect malicious traffic with low (near zero) false positives with an anomaly detection model trained with malicious traffic features to classify malicious traffic features as non-anomalous. A feature extractor receives raw, unstructured payloads (e.g., samples from network traffic) and parses the samples to extract tokens corresponding to human-readable American Standard Code for Information Interchange (ASCII) strings. These tokens are verified against a database of known malicious traffic features using a longest common substring search. Substrings present in both the database of known malicious traffic features and the extracted tokens are identified as possible malicious traffic features and assigned a value between zero and one. A feature vector generator aggregates these values across all known features (where a zero indicates absence of the feature) to create a (typically) sparse feature vector for the samples. An anomaly detection model trained on feature vectors of known malicious traffic receives the feature vector for the samples and classifies it as either non-anomalous (i.e., malicious traffic) or anomalous (i.e., unknown traffic). Using the described detection pipeline in combination with an anomaly detection model trained to identify malicious traffic feature vectors ensures a low false positive rate and allows backtracking and removal of features that are conducive to false positives.

Example Illustrations

FIG. 1 is a schematic diagram of a cloud detection service for detecting malicious traffic in unstructured payloads. A cloud detection service 101 monitors network traffic traversing or communicated to the cloud detection service 101 which includes a network traffic with unstructured payloads ("unstructured traffic") 102 from a network node 100A. A sample feature extractor 103 receives the unstructured payloads or samples of the payloads 102 and generates a malicious traffic feature query 106 for a content vulnerability database 109. In response, the content vulnerability database 109 sends a list of malicious traffic features 104 relevant to the unstructured payloads 102. The sample feature extractor 103 parses the unstructured payloads 102 to extract human-readable ASCII strings, then detects tokens in the unstructured payloads 102 corresponding to the list of malicious traffic features 104 and aggregates them into sample features 120 which it communicates to a feature vector generator 105. The feature vector generator 105 generates numerical feature vectors 122 based on the frequency of each feature in the sample features 120. An anomaly detection model 107 receives the feature vectors 122 from the feature vector generator 105 and classifies each feature vector 122 as normal or anomalous. The cloud detection service 101 communicates an indication of malicious traffic or unclassified traffic, according to the feature vector classification by the anomaly detection model 107, for reporting, notifying, and/or further analysis, for example to a device/component 112.

The unstructured payloads 102 comprise unstructured payloads encapsulated according to a communication protocol. Although a higher protocol layer (e.g., a layer 7 (application layer) protocol) implementation would assemble the payloads from packets of a lower layer communication protocol into a form that conforms to a defined or identifiable structure (e.g., Hypertext Transfer Protocol (HTTP) header fields, File Transfer Protocol (FTP) fields, Internet Message Access Protocol (IMAP) fields, etc.), this structure is lacking in the payloads as perceived at the lower layer. For instance, a TCP implementation transmits data as unstructured streams of bytes. In contrast, structured data often include fields that provide information that can present as patterns representative or indicative of behavior. To exemplify, a sample sent over an internal university network can comprise a query to a database with fields including ST_ID, ST_MAJ, ST_YEAR, ST_BUILD, . . . , wherein the fields correspond to a query for a student with the corresponding ID number, major, graduation year, and dormitory building respectively. A sample communicated across this network can have the form [1234567, Math, 2013, BuildingA, . . . ] without additional metadata informing the context of the fields because the internal university network is configured to receive samples with these specific fields. In some embodiments, the unstructured data packets are encoded to obfuscate any hidden metadata or protocol fields.

The network node 100A, although depicted generically, can be a wide variety of data sources running both internally on a network or across an Internet of Things (e.g., a node on an internal branch company network, a smart phone in communication with a household appliance, a firewall communicating intercepting traffic over an external facing network, etc.). The unstructured payloads 102 can be communicated periodically to monitor a network for unknown/zero-day threats, can be communicated based on suspected malicious activity, etc.

The sample feature extractor 103 receives the unstructured payloads 102 and parses each data sample to detect substrings satisfying a readability criteria and extracts tokens corresponding to human-readable ASCII characters. The criteria for being human-readable ASCII characters can comprise a preset list of ASCII characters that are generally considered to be human-readable including alphanumericals, for instance character numbers 48-57, 65-90, 97-122. Alternatively, punctuation can be included in domains where malicious activity is typically indicated by certain combinations of punctuation. Control characters 0-31 can be discarded as not corresponding to printable characters and likely being encrypted. Tokens can be delineated as consecutive human-readable characters separated by specific punctuation characters (e.g. spaces) and unreadable characters. Strings of consecutive unreadable characters can be replaced by a generic unreadable token that is identical across all such strings. Other criteria for readability of strings, such as determining whether the strings correspond to known words using a natural language processor, can be used.

Additionally, the sample feature extractor 103 generates a malicious traffic feature query 106 which it communicates to the content vulnerability database 109. The malicious traffic feature query 106 comprises an indicator of the general domain of the unstructured payloads 102 (e.g., a local session on a university network, a session across a cloud of mobile devices, a process intercepted by a firewall monitoring a personal computer). The malicious traffic feature query 106 can further indicate parameters corresponding to characteristics of the network session for the unstructured payloads 102 such as a type of unstructured payload, a protocol, a type of common known attack, etc.

The content vulnerability database 109 receives the malicious traffic feature query 106 and uses it to generate the list of malicious traffic features 104 to be detected by the anomaly detection model 107. The list of malicious traffic features 104 can be generated based on any of the parameters specified by the malicious traffic feature query 106. Malicious traffic features can be indexed in the content vulnerability database 109 by any of the aforementioned query parameters and the content vulnerability database 109 can have a search functionality to efficiently retrieve malicious traffic features according to a combination of different parameters. In some embodiments, the number of malicious traffic features can be constrained to include the n (e.g., 900) most relevant malicious traffic features to the malicious traffic feature query 106.

The sample feature extractor 103 correlates tokens generated in the unstructured payloads 102 with malicious traffic features in the list of malicious traffic features 104. The correlation can be determined based on a substring search finding exact or approximate matches between consecutive tokens (possibly including generic tokens for unreadable strings) and malicious traffic features in the list of malicious traffic features 104. The substring search can be performed, for instance, by concatenating the list of malicious traffic features 104 and performing a substring search comparing this concatenated list of features with a concatenated list of tokens for each sample in the unstructured payloads 102. Alternatively, each token can be compared to each malicious traffic feature in the list of the malicious traffic features 104 individually. Consecutive tokens and malicious traffic features can be matched according to exact or approximate matching. For instance, a match can occur when the ASCII characters in consecutive tokens exactly correspond to one or more features in the list of malicious traffic features 104. Alternatively, the sample feature extractor 103 can embed tokens in the unstructured payloads 102 and the list of malicious traffic features 104 into a space of word embeddings using natural language processing (e.g., word2vec) and can compute a distance in the feature space. Matches can occur when the distance between an embedded token or consecutive tokens is sufficiently close to an embedded malicious traffic feature in the space of embeddings. Other metrics of word similarity can be used.

The sample feature extractor 103 aggregates features in the list of malicious traffic features 104 that are correlated with samples in the unstructured payloads 102. The sample feature extractor 103 aggregates a list of features with duplicates for each sample in the unstructured payloads 102 into the sample features 120 along with an index of all the features in the list of malicious traffic features 104 and adds them to the sample features 120. The sample features 120 can further comprise indicators for each feature of a corresponding network session. Example sample features 118 include the features '==-:', '-==', '-==Love AV==-:', '-==syn==-:', '|'|'|', 'Gh0st', 'C4×1209x8923' which include punctuation characters. Although not depicted as having duplicate features, the example sample features 118 can include duplicates of features found in the corresponding sample. Multiple instances of a feature can indicate increased importance of the feature for malicious traffic detection.

The feature vector generator 105 receives the sample features 120. For the network session of the unstructured payloads 102, the feature vector generator 105 generates a feature vector for the corresponding features in the sample features 120 that it aggregates into the feature vectors 122. Each entry in the feature vectors 122 corresponds to a feature and the value is correlated to the frequency of that feature in the sample corresponding to the feature vector. The feature vectors 122 can be constrained or capped so that all frequency values above a threshold frequency are set to the threshold frequency value to avoid giving inflated importance to certain features. The feature vectors can be normalized or scaled so that all entries of the feature vectors are between 0 and 1 (e.g., by dividing each entry by the maximal frequency value or threshold frequency value). Other normalizations can be used, for example dividing each feature vector by the maximal frequency value. Example feature vectors 116 includes the vectors [0.0, 0.0, 0.2, 0.65, 0.0, 0.0], [1.0, 0.0, 0.0, 0.0, 0.0, 0.0], [0.0, 0.1, 0.1, 0.0, 0.0, 0.1], [0.0, 0.0, 0.2, 0.0, 0.0, 0.0], and [0.0, 0.1, 0.2, 0.3, 0.0, 0.0]. In this example, the first vector has a first feature represented/indicated by the third slot with a normalized frequency of 0.2 and a second feature with a normalized frequency of 0.65 indicated in a fourth slot of the first vector. The respective features for each entry of the feature vectors in the example feature vectors 116 could correspond, for instance, to each of the features enumerated in the example sample features 118. The feature vectors 122 can additionally comprise the corresponding samples from the unstructured payloads 102 along with indicators pairing feature vectors with the corresponding unstructured payloads.

An anomaly detection model 107 receives the feature vectors 122 and classifies the feature vectors 122 as anomalous or non-anomalous/normal. The anomaly detection model 107 communicates the classification with either an unclassified traffic indicator 108 or malicious traffic indicator 110 to a device/component 112. The anomaly detection model 107 is typically a one-class classifier that is trained on feature vectors for known malicious traffic samples to detect malicious traffic samples as "normal" or "non-anomalous" and everything else as "anomalous," i.e. it is trained to detect the distribution of feature vectors for known malicious traffic and distinguish them from outlier samples that may or may not be malicious. For instance, the anomaly detection model 107 can be a one-class support vector machine (SVM). According to the classification by the anomaly detection model 107, either an unclassified traffic indicator 108 or a malicious traffic indicator 110 is communicated to a device or component 112. The device or component 112 may be a separate security analysis system, user interface component in communication with the cloud detection service 101, etc.

Figure 2:
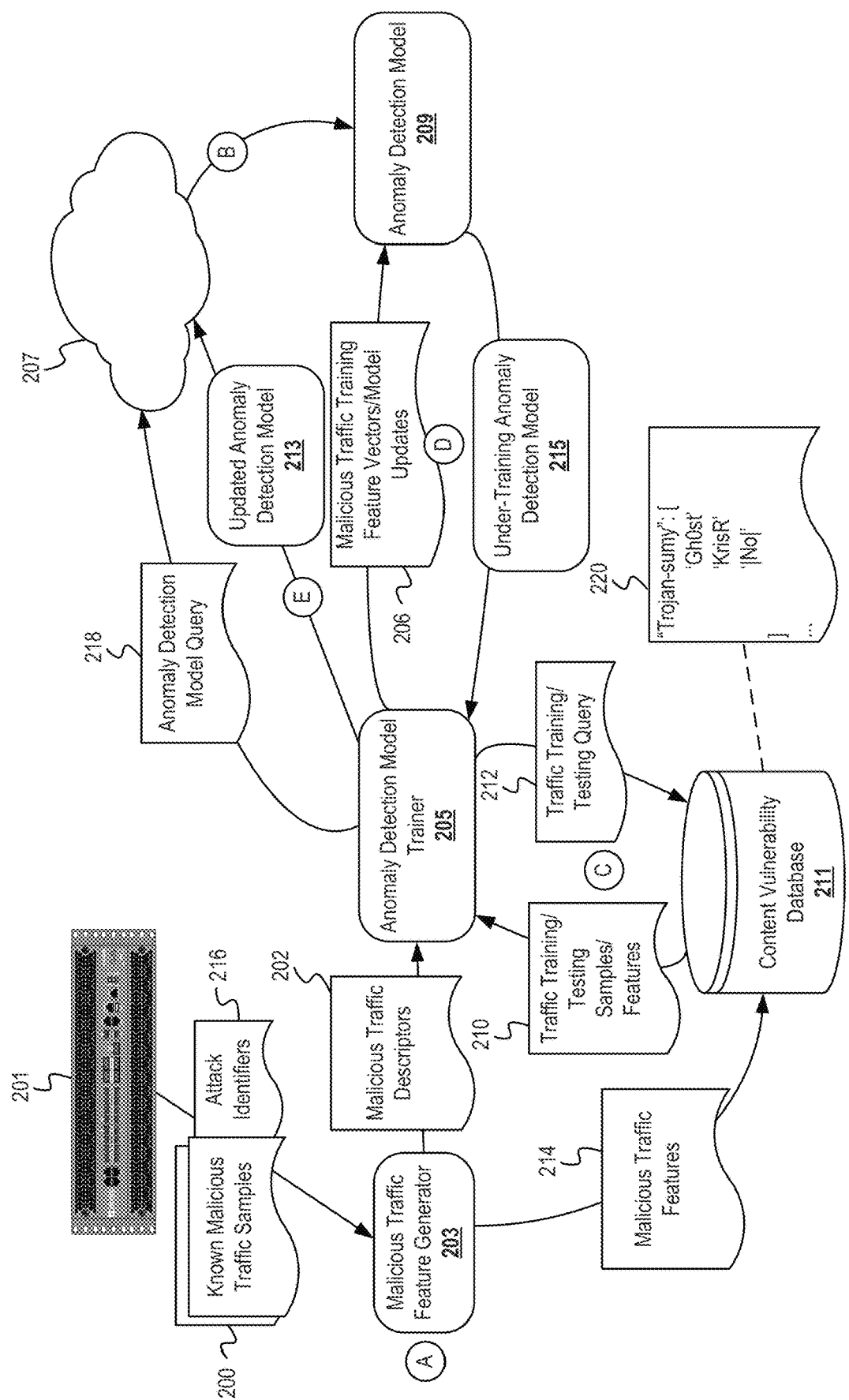
FIG. 2 is a schematic diagram of an anomaly detection model trainer for training and updating an anomaly detection model for malicious traffic detection.

FIG. 2 is a schematic diagram of an anomaly detection model trainer for training and updating an anomaly detection model for malicious traffic detection. FIG. 2 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

A security product 201 communicates known malicious traffic samples 200, or possibly just the payloads thereof, and corresponding attack (malware type/family) identifiers 216 to a malicious traffic feature generator 203. The known malicious traffic samples 200 are session based (i.e., represent traffic from a network session). Each of the attack identifiers 216 identifies and possibly provides a descriptor for one or more of the per session malicious traffic samples 200 (e.g., an attack name and description of the attack, malware family type, etc.). After an anomaly detection model trainer 205 trains an anomaly detection model with the known malicious traffic samples 200 (or a subset thereof) and corresponding attack identifiers 216 to classify malicious traffic features as normal, the trained malicious traffic detection model can be deployed to a cloud service 207.

At stage A, the security product 201 sends the session based known malicious traffic samples 200 and corresponding attack identifiers 216 to the malicious traffic feature generator 203. The security product 201 can be any security product that intercepts potential malicious traffic samples across a network, running on an endpoint, in a cloud, etc. The attack identifiers 216 can include a broad malicious traffic type identifier and a narrower malicious traffic family identifier. For instance, the malicious traffic type identifier can be 'trojan,' 'spyware,' 'ransomware,' 'virus,' etc. and if the malicious traffic type identifier is 'trojan' then the subclass malicious traffic family identifiers can include 'zusy,' 'zegost,' 'bladabindi,' 'nimnul,' etc.

The malicious traffic feature generator 203 groups the malicious traffic samples 200 by corresponding attack identifiers 216. The common substrings can be determined using a longest common substring search (e.g., by constructing a suffix tree using dynamic programming). Among the longest sub strings, malicious traffic features can be determined based, for example, on a term frequency-inverse document frequency (tf-idf) frequency or the base frequency of substrings in the longest common substrings above a certain length. Other criteria such as readability of ASCII characters in the substrings can be used. The malicious traffic feature generator 203 aggregates these malicious traffic features and adds them along with the malicious traffic samples 200 to generate malicious traffic samples/features 214 which it communicates to a content vulnerability database 211. The content vulnerability database 211 can add the malicious traffic samples 200 to its' database of malicious traffic samples and can additionally update an internal list of malicious traffic features. This list can be dynamically updated according whether the tf-idf frequency for the malicious traffic features is above a threshold tf-idf frequency, based on a threshold number of malicious traffic features, etc. These frequencies can be updated using a longest common substring search of samples in the content vulnerability database 211. Old/outdated features that are less common in new attacks can be deleted to make room for new features. The content vulnerability database 211 can maintain multiple lists of malicious traffic features corresponding to malicious traffic samples from different domains or originating from different types of attacks.

The content vulnerability database 211 can store and update malicious traffic features and malicious traffic samples by attack family and type. An example malicious traffic feature list 220 is for trojan horse threat type and family sumy as indicated by the "Trojan-sumy" string. This attack family/type pair includes the malicious traffic features 'gH0st,' 'KrisR,' and '|No|' as indicated by the strings between the brackets.

The malicious traffic feature generator 203 or the security product 201 can additionally communicate information, such as malicious traffic descriptors 202 to the anomaly detection model trainer 205. The malicious traffic descriptors 202 can comprise metadata about attack(s) associated with the known malicious traffic samples 200. For instance, the malicious traffic descriptors 202 can comprise a domain for the security product (cloud service, internal database, etc.), an attack type such as a process injection, a communication protocol for malicious traffic samples in the known malicious traffic samples 200, etc. Furthermore, domain-level expert knowledge of the malicious traffic samples 200 can be provided to add any potential descriptors that could determine what anomaly detection models need updating and/or training.

At stage B, the anomaly detection model trainer 205 generates an anomaly detection model query 218 which it communicates to the cloud service 207. The anomaly detection model query 218 can include a set of attack type/family pairs corresponding to the malicious traffic descriptors 202 as well as other metadata that can help determine an anomaly detection model to update. The cloud service 207 receives the anomaly detection model query 218 and uses it to identify an anomaly detection model 209 to train and/or update. Although depicted as separate components, the cloud service 207 can include the security product 201, the anomaly detection model trainer 205, and the malicious traffic feature generator 203 and can be a comprehensive cloud management service for generating anomaly detection models, identifying new/unknown attacks, detecting samples associated with the new/unknown attacks, and training and/or updating the anomaly detection models accordingly. Alternatively, the cloud service 207 can include any subset of the above functionalities.

The cloud service 207 identifies characteristics in the malicious traffic descriptors 202 that correspond to existing anomaly detection models. For instance, the cloud service 207 can search for an anomaly detection model that has been trained to detect similar types of attacks or that operate on similar domains as the domain for the recently identified malicious traffic samples 200. In some embodiments, no existing model corresponding to the malicious traffic descriptors 202 exists. In this case, the cloud service 207 can initialize an anomaly detection model to be implemented for detection of malicious traffic corresponding to the recently identified malicious traffic samples 200 to be trained by the anomaly detection model trainer 205. The cloud service 207 communicates the anomaly detection model 209 to the anomaly detection model trainer 205.

At stages C and D, the anomaly detection model trainer 205 begins iteratively training and/or updating the anomaly detection model 209. At stage C, the anomaly detection model trainer 205 generates the traffic training/testing query 212 which it communicates to the content vulnerability database 211. The traffic training/testing query 212 comprises metadata that identifies relevant malicious samples for training and testing the current anomaly detection model as identified in the malicious traffic descriptors 202 such as attack type/family pairs. The content vulnerability database 211 performs a lookup of malicious training traffic samples and related malicious training traffic features according to the metadata contained in the traffic training/testing query 212. Additionally, the content vulnerability database 211 performs a lookup of benign and malicious test samples/features also according to metadata in the traffic training/testing query 212. For instance, the content vulnerability database 211 can retrieve malicious traffic samples corresponding to process injection attacks that the current anomaly detection model is configured to detect. The test samples/features can comprise benign traffic samples from a system and can be samples running on a system that previously or subsequently experienced an attack such as process injection. Testing with both malicious and benign traffic samples/features ensures accurate metrics for generalized false positive rate and detection rate. Malware samples and features can be indexed by attack type/family pairs in the content vulnerability database 211 to increase lookup efficiency. The content vulnerability database 211 returns traffic training/testing samples/features 210 related to the traffic training/testing query 212 to the anomaly detection model trainer 205. In some embodiments, the anomaly detection model trainer 205 receives the malicious traffic samples/features 214 directly from the malicious traffic feature generator 203 at stage A that are generated using the recently identified malicious traffic samples 200 and attack identifiers 216 which it uses to train the corresponding anomaly detection model.

At stage D, the anomaly detection model trainer 205 iteratively communicates malicious traffic training feature vectors/model updates 206 to the anomaly detection model 209, the anomaly detection model 209 updates its' internal parameters and uses the malicious traffic training feature vectors in the malicious traffic training feature vectors/model updates 206 to generate an under-training anomaly detection model 215 which it communicates to the anomaly detection model trainer 205. At an initial iteration, the anomaly detection model trainer 205 generates feature vectors from the traffic training/testing samples/features 210 that it can divide into training and testing samples, wherein the testing samples comprise malicious and benign samples and the training samples comprise malicious samples. The anomaly detection model trainer 205 generates the feature vectors by extracting tokens corresponding to human-readable ASCII substrings of the traffic training/testing samples, replacing unreadable ASCII substring with generic unreadable tokens, and correlating these tokens with features in the traffic training/testing samples/features 210. The feature vectors then correspond to each of the traffic training/testing samples in the traffic training/testing samples/features 210 and each entry in the feature vectors corresponding to a traffic feature in the traffic training/testing samples/features 210 comprises a value between 0 and 1 indicating a frequency of the corresponding feature in the corresponding traffic sample.

In the initial iteration, the anomaly detection model trainer 205 sends the generated feature vectors to the anomaly detection model 209 which it uses to generate the under-training anomaly detection model 215. The anomaly detection model trainer 205 evaluates the under-training anomaly detection model 215 to determine model updates to include in the malicious traffic training feature vectors/model updates 206 in future iterations. For example, if the anomaly detection model 209 is a one class SVM and $\{x_i\}_{i=1}^n$ are the feature vectors at the current iteration, then the one class SVM determines the under-training anomaly detection model 215 by minimizing the following quadratic program:

$$\min_{w \in F, \xi \in R^n, \rho \in R} \frac{1}{2}\|w\|^2 + \frac{1}{vn}\sum_{i=1}^{n}\xi_i - \rho \quad (1)$$

$$\text{subject to } (w \cdot \varphi(x_i)) \geq \rho - \xi_i, \xi_i \geq 0. \quad (2)$$

Here, $\varphi(x)$ is a kernel function (e.g, the identity), F is the range of the kernel function $\varphi(x)$: $R^n \to F$, and $v>0$ is a parameter that can be tuned in practice. A typical choice can be $v=0.05$. During training, the one class SVM minimizes the above quadratic program. Subsequently, if sgn$((w\cdot\varphi(x))-\rho)=1$ at the minimum, the sample x is classified as malicious traffic. Otherwise the sample remains unclassified. For the embodiment where $\varphi(x)$ is the identity and assuming the quadratic problem has a non-trivial solution, then the criterion that sgn $((w\cdot\varphi(x))-\rho)=1$ ensures that samples classified as malicious traffic correspond to feature vectors that avoid the origin. This aligns with the fact that at least one malicious traffic feature corresponding to an entry in the feature vector was detected in the sample, and thus the feature vector has a non-zero entry. The under-training anomaly detection model 215 is communicated to the anomaly detection model trainer 205.

The anomaly detection model trainer 205 receives the under-training anomaly detection model 215 and determines whether the under-training anomaly detection model 215 satisfies a model performance criterion. A typical performance criterion is that the under-training anomaly detection model 215 satisfies a false positive rate performance criterion on a test set of the traffic training/testing samples/features 210 (e.g., that the false positive rate is below 0.01%). If the anomaly detection model trainer 205 determines that the under-training anomaly detection model 215 satisfies the performance criterion, then the anomaly detection model trainer 205 proceeds to deploy or indicate for deployment a final updated anomaly detection model 213. Otherwise, the anomaly detection model trainer 205 determines model updates for the under-training anomaly detection model 215. The model updates can comprise updating the architecture of the under-training anomaly detection model 215 and/or any hyperparameters associated with the under-training anomaly detection model 215. For the case of a one-class SVM, the v parameter can be increased to increase the number of outliers (i.e. anomalous or unclassified samples).

At stage E, the anomaly detection model trainer 205 determines that the under-training anomaly detection model 215 has been successfully updated or a maximal number of update iterations have elapsed. The maximal number of iterations can depend on the available computing resources, the model complexity, the amount of available training data, etc. The anomaly detection model trainer 205 aggregates the under-training anomaly detection model 215 along with indicators of whether the updating/training was successful and sends the final updated anomaly detection model 213 to the cloud service 207. The cloud service 207 can implement the final updated anomaly detection model 213 or can perform independent model evaluation such as AB testing before determining that any update anomaly detection model can be implemented.

The example operations in FIGS. 3-8 are described with reference to a cloud detection service and an anomaly detection model trainer for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
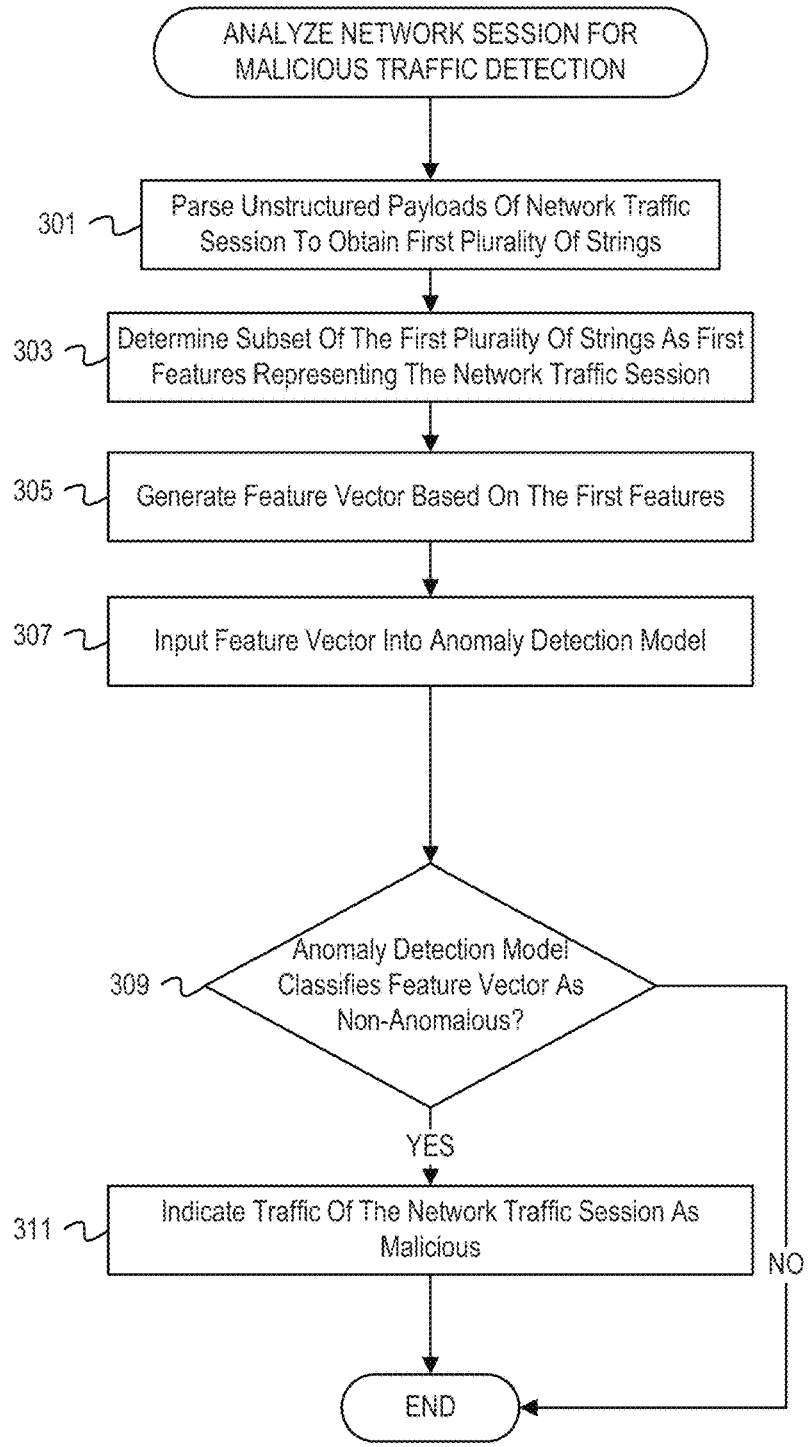
FIG. 3 is a flowchart of example operations for analyzing network session traffic for malicious traffic.

FIG. 3 is a flowchart of example operations for analyzing network session traffic for malicious traffic. At block 301, a cloud detection service parses unstructured payloads of a network traffic session to obtain a first plurality of strings. The cloud detection service can extract tokens from the unstructured payloads by removing non-readable ASCII characters and by detecting readable strings the first plurality of strings.

At block 303, the cloud detection service determines a first subset of the first plurality of strings as first features representing the network session. The determination is based, at least in part, on correlations of the first plurality of strings with a second plurality of strings previously identified as second features corresponding to known malicious traffic. The correlations can be based on an exact or approximate match of strings in the first and second plurality of strings.

At block 305, the cloud detection service generates a feature vector based on the first features. The feature vector can be generated using frequencies of strings in the first plurality of strings being correlated with strings in the second plurality of strings. The cloud detection service can determine the frequencies using base frequencies of the first plurality of strings or a tf-idf statistic and can subsequently normalize the frequencies so that entries of the feature vector are between 0 and 1.

At block 307, the cloud detection service inputs the feature vector into an anomaly detection model. The anomaly detection model can be a model trained on feature vectors for known malicious traffic sessions to classify feature vectors as non-anomalous (i.e., malicious) or anomalous (i.e., unclassified, or unknown).

At block 309, the cloud detection service determines whether the anomaly detection model classified the feature vector as non-anomalous. If the anomaly detection model classified the feature vector as non-anomalous, operations proceed to block 311. Otherwise, the operations in FIG. 3 are complete.

At block 311, the cloud detection service indicates traffic of the network session as malicious. The cloud detection service can forward traffic for the network session to a virtual machine or attack analyzer for further analysis of any related threats and can increase threat levels for nodes corresponding to the network session.

Figure 4:
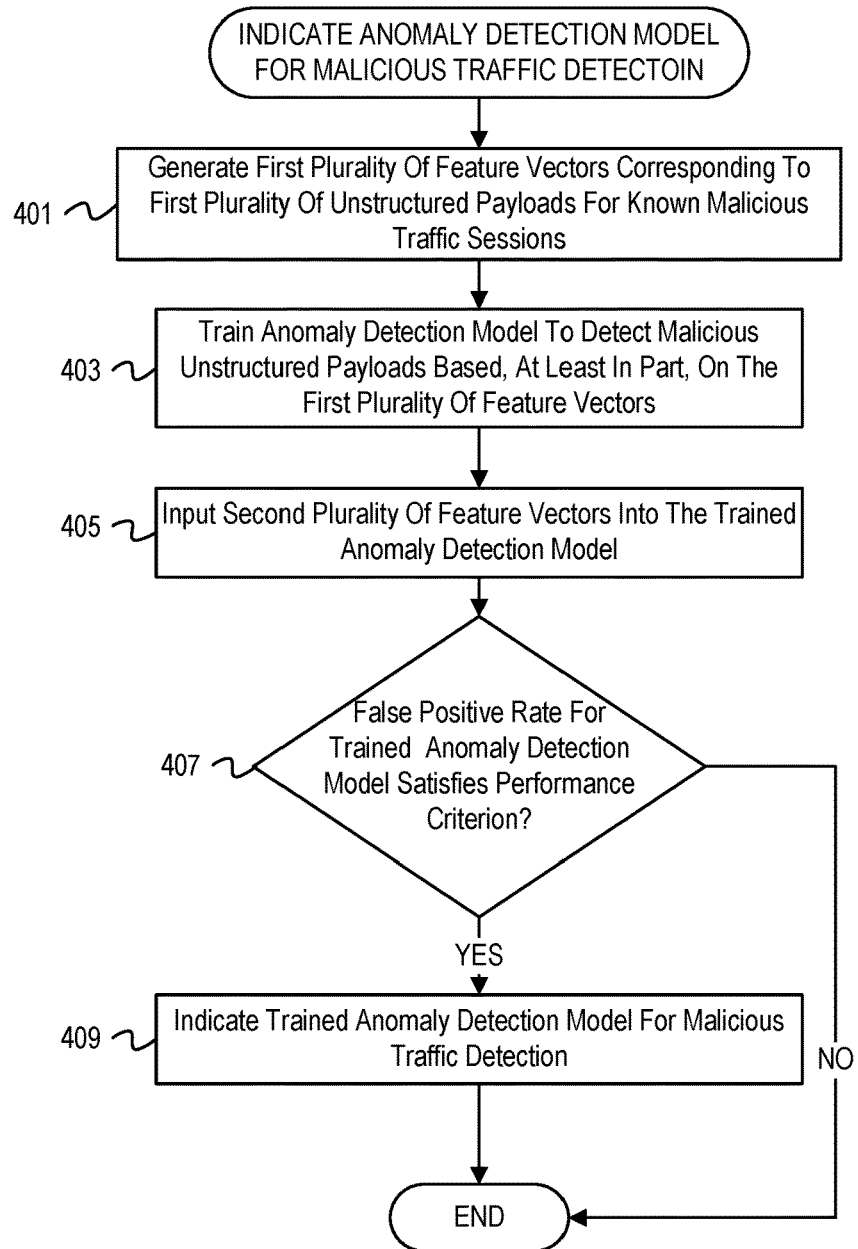
FIG. 4 is a flowchart of example operations for indicating an anomaly detection model for malicious traffic detection.

FIG. 4 is a flowchart of example operations for indicating an anomaly detection model for malicious traffic detection. At block 401, an anomaly detection model trainer generates a first plurality of feature vectors corresponding to a first plurality of unstructured payloads for known malicious traffic sessions. The anomaly detection model trainer can extract substrings (i.e., tokens) from the first plurality of unstructured payloads and can determine correlations between the substrings and a list of known malicious substrings. The feature vectors can comprise frequencies of the first plurality of unstructured payloads being correlated with the list of known malicious substrings.

At block 403, the anomaly detection model trainer trains an anomaly detection model to detect malicious unstructured payloads based, at least in part, on the first plurality of feature vectors. The anomaly detection model trainer can input the first plurality of feature vectors into the anomaly detection model and update internal parameters and/or model architecture of the anomaly detection model based on the classifications of the anomaly detection model on the first plurality of feature vectors.

At block 405, the anomaly detection model trainer inputs a second plurality of feature vectors into the trained anomaly detection model. The second plurality of feature vectors can be a test set of feature vectors generated from known malicious traffic sessions or known benign traffic sessions.

At block 407, the anomaly detection model trainer determines whether the false positive rate for the trained anomaly detection model on the second plurality of feature vectors satisfies a performance criterion. The performance criterion can be that the false positive rate is below a threshold false positive rate and can include additional criteria such as a detection rate, a model efficiency criterion, etc. If the false positive rate for the trained anomaly detection model satisfies the performance criterion, operations proceed to block 409. Otherwise, the operations in FIG. 4 are complete.

At block 409, the anomaly detection model trainer indicates the trained anomaly detection model for malicious traffic detection. The anomaly detection model trainer can communicate the trained anomaly detection model to a cloud detection service for monitoring traffic sessions over a cloud, running on an endpoint, communicated across an Internet of Things, etc.

Figure 5:
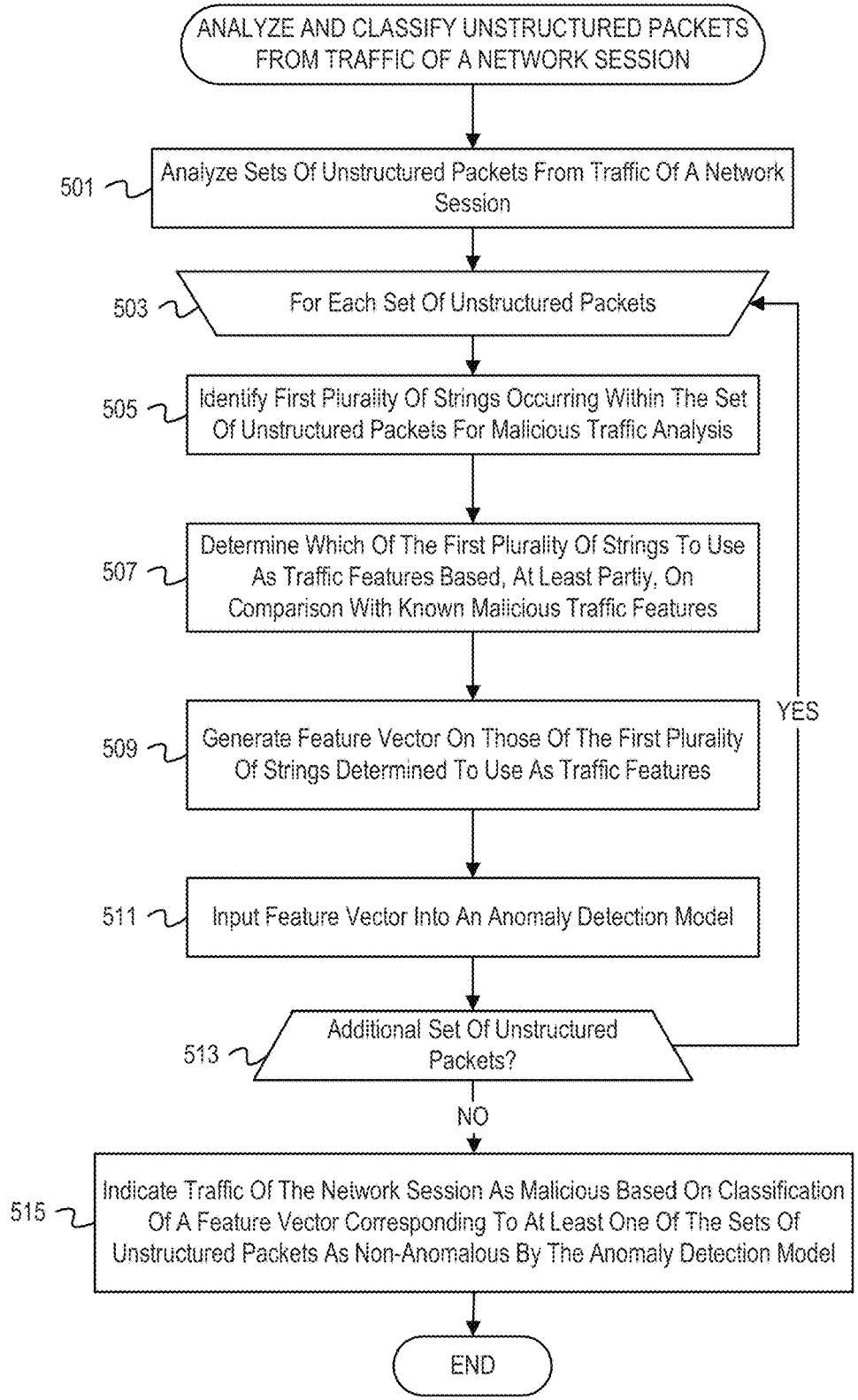
FIG. 5 is a flowchart of example operations for analyzing and classifying unstructured packets from traffic of a network session.

FIG. 5 is a flowchart of example operations for analyzing and classifying unstructured packets from traffic of a network session. At block 501, a cloud detection service analyzes sets of unstructured packets from a traffic of a network session. The analysis can include the operations at blocks 503, 505, 507, 509, 511, and 513. The analysis can further comprise applying alternative classifiers and/or feature extraction methodologies to the sets of unstructured packets.

At block 503, the cloud detection service begins iterating over the sets of unstructured packets. The operations at each iteration include the operations at blocks 505, 507, 509, and 511.

At block 505, the cloud detection service identifies a first plurality of strings occurring within the current set of unstructured packets for malicious traffic analysis. The cloud detection service can determine strings of consecutive readable ASCII characters in the current set of unstructured packets and can replace consecutive unreadable ASCII characters with a generic token or string or can detect readable strings using other readability criteria. This determination can occur across unstructured packets.

At block 507, the cloud detection service determines which of the first plurality of strings to use as traffic features based, at least in part, on a comparison with known malicious traffic features. The comparison can comprise exact or approximate matches of strings in the first plurality of strings with the known malicious traffic features.

At block 509, the cloud detection service generates a feature vector on those of the first plurality of feature vectors determined to use as traffic features. The feature vector can comprise frequencies of known malicious traffic features in the corresponding strings from the first plurality of strings and can be normalized/transformed for inputting into an anomaly detection model.

At block 511, the cloud detection service inputs the feature vector into an anomaly detection model. The anomaly detection model can be trained on feature vectors for known malicious traffic sessions to classify network traffic as malicious or unknown/undetermined classification.

At block 513, the cloud detection service determines whether there is an additional set of unstructured packets. If there is an additional set of unstructured packets, operations return to block 503. Otherwise, operations proceed to block 515.

At block 515, the cloud detection service indicates traffic of the network session as malicious based on classification of a feature vector corresponding to at least one of the sets of unstructured packets as non-anomalous by the anomaly detection model. The cloud detection service can increase threat levels for nodes exposed to the network session and can communicate these threat levels and indicators of the malicious traffic to the network and/or other firewall services.

Figure 6:
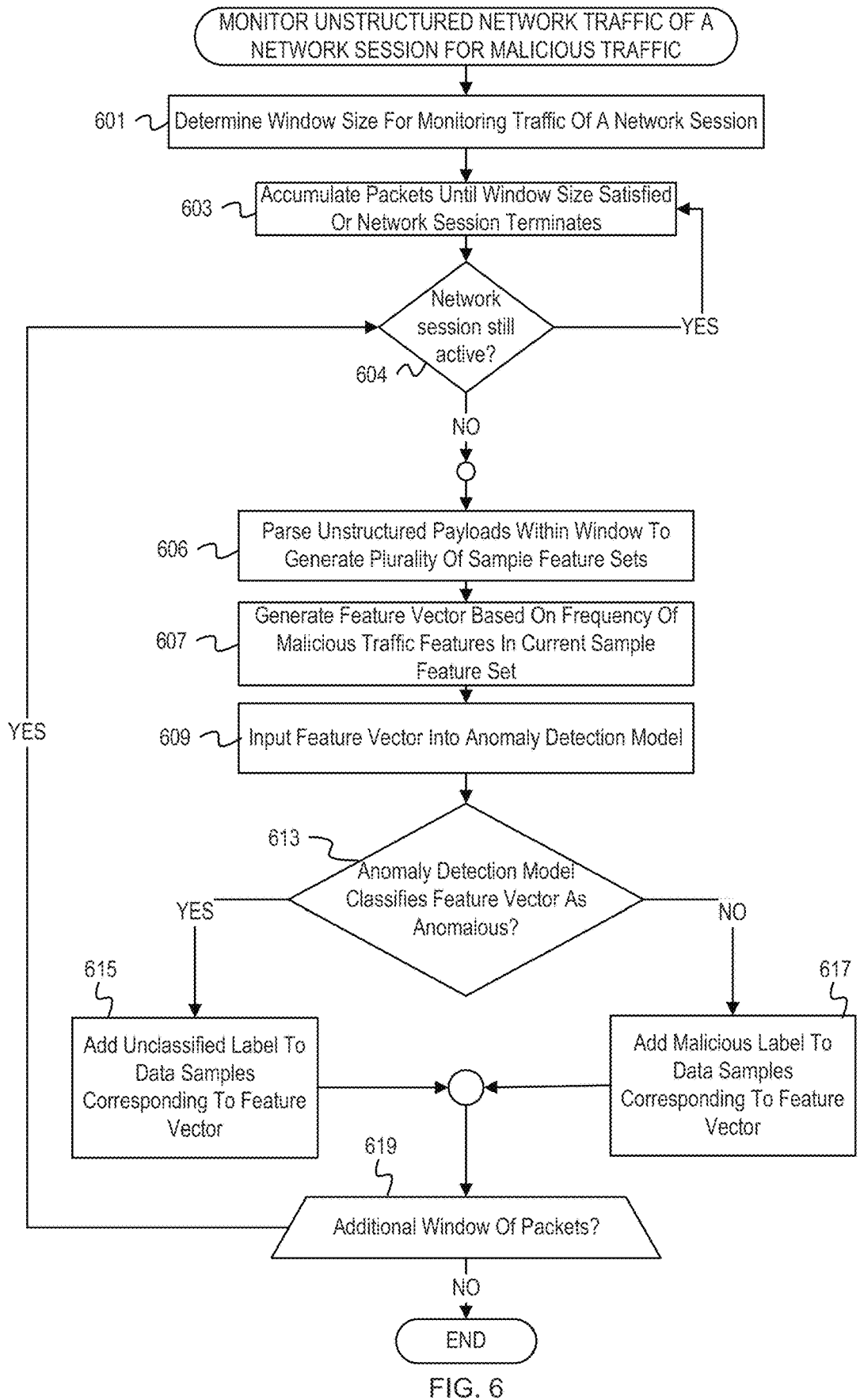
FIG. 6 is a flowchart of example operations for monitoring unstructured network traffic for malicious traffic.

FIG. 6 is a flowchart of example operations for monitoring unstructured network traffic for malicious traffic. A cloud detection service uses an anomaly detection model trained to classify malicious traffic as normal or not an outlier. The cloud detection service monitors traffic per network session. For instance, the cloud detection service may instantiate a monitoring process for each network session detected.

At block 601, the cloud detection service determines a window size for monitoring traffic of a network session. The window size can be defined with one or both of number of packets and amount of data. As an example, the window size for monitoring traffic can be configured as the greater of 3 packets and 1500 bytes. The traffic monitoring window size can be configured in a configuration file, through a user interface of the cloud detection service, etc. The size can be determined based on statistics of a minimum number of packets or amount of data to generate a feature vector that may correspond to malicious traffic.

At block 603, the cloud detection service accumulates packets until the traffic monitoring window size is satisfied. Since the cloud detection service will generate feature vectors from across packets of a network session, the cloud detection service accumulates the packets for processing to extract features. Since the features are generated from the unstructured payloads, embodiments can limit the accumulation to payloads. The cloud detection service can concatenate payloads as they arrive within the traffic monitoring window. Instead of accumulating payloads or packets, embodiments can incrementally construct a feature source by concatenating payloads as they are detected. When the window size is satisfied, the network session terminates, or another analysis criterion for the accumulated packets is satisfied, operations continue to block 604

At block 604, the cloud detection service determines whether the network session has terminated. The connection may have been terminated by a user or another process. The cloud detection service can determine that the session has terminated based on connection tear down messages or time out (i.e., lack of packets for a time period). If the network session has terminated, then operations continue at block 606.

At block 606, the cloud detection service parses unstructured payloads ("data samples") accumulated within the window to generate a plurality of sample feature sets. The cloud detection service can extract tokens corresponding human-readable ASCII characters in the unstructured payloads, can replace unreadable ASCII characters with generic unreadable tokens (e.g. nil characters) and can aggregate the tokens for each unstructured data sample to generate the sample feature sets.

At block 607, the cloud detection service generates a feature vector based on the frequency of malicious traffic features in the sample feature set at the current iteration. The cloud detection service can correlate consecutive tokens in the current sample feature set using a database of malicious traffic features using a substring search, where the correlation is made using a similarity metric between strings, an exact match, or other appropriate metrics. The feature vector can be a numerical vector where each entry corresponds to a malicious traffic feature in the database of malicious traffic features and the value at each entry indicates a frequency of that malicious traffic feature in the current sample feature set. The frequency can be a normalized frequency, a tf-idf statistic, etc. The feature vector can be further normalized for inputting into an anomaly detection model.

At block 609, the cloud detection service inputs the feature vector generated at block 607 into an anomaly detection model to classify the corresponding feature set. The anomaly detection model can be pretrained on malicious traffic data samples to detect malicious traffic using outlier detection methods. For instance, the anomaly detection model can be one of a one-class support vector machine, a hidden Markov model, a Bayesian network, etc.

At block 613, the cloud detection service determines whether the anomaly detection model classified the feature vector as anomalous. If the anomaly detection model classified the feature vector as anomalous, operations proceed to block 615. Otherwise, operations proceed to block 617.

At block 615, the cloud detection service adds an unclassified label to the data samples of the monitored network session corresponding to the feature vector. The unclassified label indicates that the network traffic has not been classified as malicious or benign with sufficient likelihood and further analysis of the unstructured traffic may be performed.

At block 617, the cloud detection service adds a malicious label to the data samples of the monitored network session corresponding to the feature vector. The malicious label indicates a high likelihood that the traffic of the network session is malicious i.e. corresponds to an attack.

At block 619, the cloud detection service determines whether there is an additional window of packets or payloads. If there is an additional window of packets, operations return to block 603. Otherwise, the operations in FIG. 6 terminate.

Figure 7:
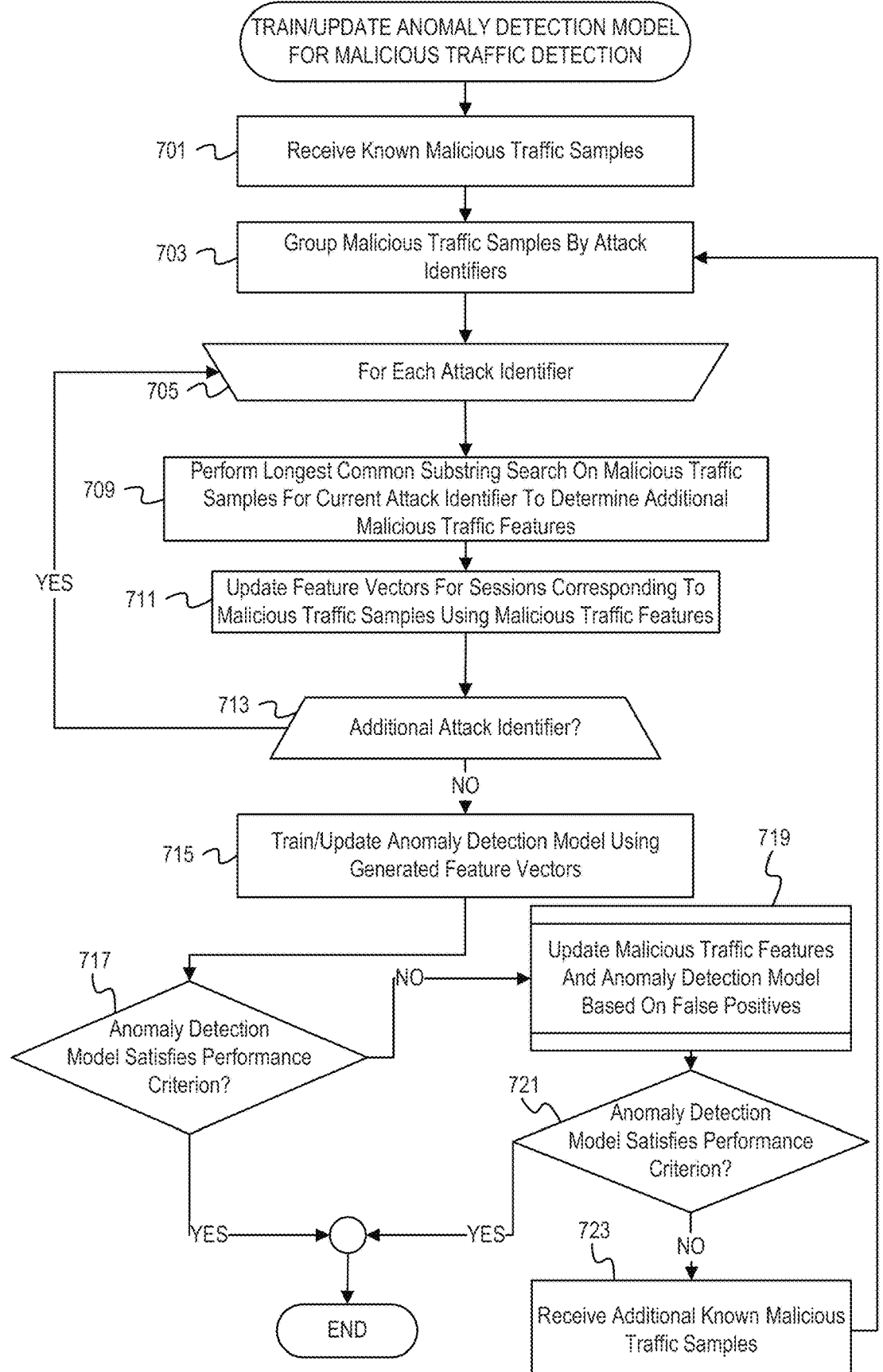
FIG. 7 is a flowchart of example operations for training and updating an anomaly detection model for malicious traffic detection.

FIG. 7 is a flowchart of example operations for training and updating an anomaly detection model for malicious traffic detection. At block 701, an anomaly detection model trainer receives known malicious traffic samples. The known malicious traffic samples can be for a single traffic session (e.g. over a network, on an endpoint, over an Internet of Things) or over multiple traffic sessions with labels for the corresponding session. The traffic sessions can be unstructured i.e. samples sent during a session can lack metadata and/or a protocol layer that would otherwise inform a model about malicious behavior.

At block 703, the anomaly detection model trainer groups the malicious traffic samples by attack identifiers such as an attack type/family. The attack type is a broad identifier such as a virus, a worm, a trojan horse, spyware, ransomware, etc. The attack family is a more specific identifier that is a subclass of the attack type associated with a set of applications running similar attacks. For instance, if the attack type is a trojan horse, then the attack family can be zusy, zegost, bladabindi, razy, mirai, etc. The malicious traffic samples can contain labels indicating an attack type and attack family or the anomaly detection model trainer can infer the attack family and attack type by analyzing the malicious traffic samples. For instance, a model can be pretrained to identify attack families and attack types using preprocessed malicious traffic samples as input.

At block 705, the anomaly detection model trainer begins iterating through the attack identifiers in the malicious traffic samples. The operations at each iteration are described at blocks 709, and 711.

At block 709, the anomaly detection model trainer performs a longest common substring search on malicious traffic samples for the current attack identifier to determine additional malicious traffic features. The longest common substrings can be determined using, for instance, a suffix tree with dynamic programming. The anomaly detection model trainer can choose the n longest common substrings for some predetermined value of n to be the additional malicious traffic features for the current attack identifier that can depend on the number of existing malicious traffic features. Alternatively, the additional malicious traffic features can be determined based on a combination of length and frequency in the malicious traffic samples. In some embodiments, unreadable characters can be omitted during the longest common substring search or common substrings with unreadable characters can be omitted and/or reduced to substrings of human-readable characters. The anomaly detection model trainer adds the additional malicious traffic features to a list of malicious traffic features.

At block 711, the anomaly detection model trainer updates vectors for sessions corresponding to malicious traffic samples using malicious traffic features. At a first iteration, the anomaly detection model trainer can initialize feature vectors for all sessions indicated in the malicious traffic samples for the initial attack identifier. In subsequent iterations, the anomaly detection model trainer can update feature vectors for sessions that have already been initialized and/or can initialize feature vectors for sessions that have not already been initialized. Initializing and updating feature vectors comprises determining a frequency of substrings in the malicious traffic samples for the current session that identically or approximately match malicious traffic features in the current list of malicious traffic features. These substrings can include the substrings determined in the longest common substring search at block 709 as well as additional substrings matching malicious traffic features at previous iterations.

At block 713, the anomaly detection model trainer determines if there is an additional attack identifier. If there is an additional pair, operations return to block 705. Otherwise, operations continue to block 715.

At block 715, the anomaly detection model trainer trains/updates an anomaly detection model using the generated feature vectors. The anomaly detection model trainer can input the feature vectors generated at blocks 705, 709, 711, and 713 as input to the anomaly detection model and, based on whether the anomaly detection model correctly classifies the feature vectors as malicious, can update internal parameters for the anomaly detection model. For an anomaly detection model that has already been trained, the feature vectors can be used as additional training data to update the anomaly detection model. Alternatively, the anomaly detection model trainer can use the feature vectors (possibly with feature vectors used in previous training iterations) to solve an optimization program that trains the anomaly detection model. When the anomaly detection model is a one-class SVM, the anomaly detection model trainer solves an optimization problem involving the feature vectors to learn a normal region specified by hyperplanes in the solution to the quadratic program. The anomaly detection model trainer can split the feature vectors generated at blocks 705, 709, 711, and 713 into a training set and a testing set. The anomaly detection model trainer can additionally query a database for malicious and/or benign test feature vectors and traffic samples. Other partitions of the feature vectors such as k-fold cross validation can be used.

At block 717, the anomaly detection model trainer determines whether the anomaly detection model satisfied a performance criterion. The performance criterion that a false positive rate for the anomaly detection model on a test set of feature vectors is below a threshold false positive rate (e.g. 0.01%). Alternatively, the anomaly detection model can be trained k times on all but 1/k of the feature vectors at block

715. The k anomaly detection models can be tested on the 1/k feature vectors that each of them wasn't trained on and the performance criterion can be that all k of the anomaly detection models has a false positive rate below a threshold false positive rate. Other performance criterion such as model efficiency can be used. While model training is performed on known malicious traffic samples, model testing can additionally use benign samples to ensure low generalization error. The operations at blocks 701, 703, 705, 709, 711, and 713 can alternatively be performed on known benign traffic samples, and the generated feature vectors can be used for model testing. If the anomaly detection model satisfies the performance criterion, operations in FIG. 7 are complete. Otherwise, operations proceed to block 719.

At block 719, the anomaly detection model trainer updates the malicious traffic features and/or benign traffic features and the anomaly detection model based on the false positives for the anomaly detection model determined at block 717. The operations at block 719 are described in more detail in FIG. 8.

At block 721, the anomaly detection model trainer determines whether the updated anomaly detection model satisfies a performance criterion. The performance criterion can be substantially similar to the performance criterion at block 717. The anomaly detection model can be tested on an updated set of feature vectors using the updated malicious traffic features and existing benign features. The anomaly detection model trainer can search for exact or approximate matches of substrings in the malicious traffic samples with malicious traffic features and can construct a vector of frequencies for each of the malicious traffic features occurring in the malicious traffic samples. If the anomaly detection model satisfies the performance criterion, the operations in FIG. 7 are complete. Otherwise, operations proceed to block 723.

At block 723, the anomaly detection model trainer receives additional known malicious traffic samples. The anomaly detection model trainer can query a content vulnerability database for additional malicious traffic samples. The query can specify certain attack identifiers that the anomaly detection model is configured to detect. Operations proceed to block 703.

Figure 8:
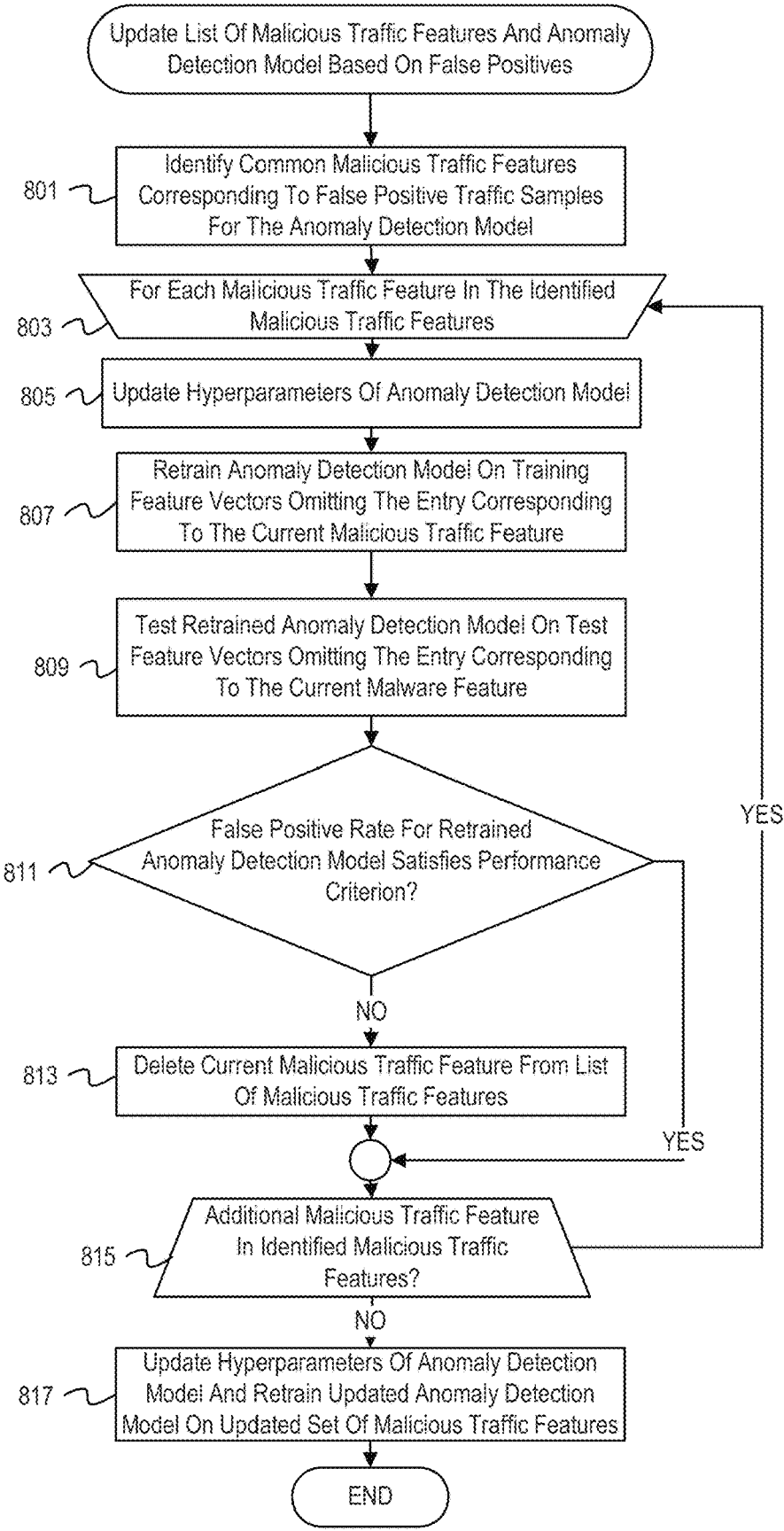
FIG. 8 is a flowchart of example operations for updating a list of malicious traffic features and an anomaly detection model based on false positives of the anomaly detection model on training data.

FIG. 8 is a flowchart of example operations for updating a list of malicious traffic features and an anomaly detection model based on false positives of the anomaly detection model on training data. At block 801, an anomaly detection model trainer identifies common malicious traffic features corresponding to false positive software samples for the anomaly detection model. The anomaly detection model trainer can rank malicious traffic features in the false positive software samples (as determined by approximate or exact matching with the list of malicious traffic features) by frequency or a metric of frequency such as a tf-idf statistic. The anomaly detection model trainer can choose the top n most frequent malicious traffic features to be the common malicious traffic features and can incorporate different criteria such as the corresponding attack identifier, format of the malicious traffic feature, etc.

At block 803, the anomaly detection model trainer begins iterating through malicious traffic features in the malicious traffic features identified at block 801. Example operations for each iteration include the operations at blocks 805, 807, 809, 811, and 813.

At block 805, the anomaly detection model trainer updates hyperparameters of the anomaly detection model. For instance, when the anomaly detection model is a one-class SVM, the anomaly detection model trainer can tweak hyperparameters of the quadratic program used to train the one-class SVM that will widen the area of the resulting region after optimizing the quadratic program. This has the effect of detecting more malicious traffic samples due to the widened region of malicious traffic classification. The updates to the anomaly detection model can depend on the current malicious traffic feature.

At block 807, the anomaly detection model trainer retrains the anomaly detection model on training feature vector omitting the entry corresponding to the current malicious traffic feature. The training feature vectors are the same feature vectors used on the anomaly detection model that generated the false positive software samples.

At block 809, the anomaly detection model trainer tests the retrained anomaly detection model on test feature vectors omitting the entry corresponding to the current malicious traffic feature. Thus, correctly classified software samples that were previously false positive software samples reflect a direct improvement in the false positive rate of the anomaly detection model due to removal of the current malicious traffic feature.

At block 811, the anomaly detection model trainer determines whether the false positive rate for the retrained anomaly detection model satisfies a performance criterion. The performance criterion can be that the false positive rate is below a threshold false positive rate or can include other criteria such as model efficiency. The threshold false positive rate can be lower that the threshold false positive rate when evaluating the anomaly detection model for malicious traffic detection because it will be improved as multiple malicious traffic features are removed from the list of malicious traffic features. If the false positive rate satisfies the performance criterion, operations skip to block 815. Otherwise, operations continue to block 813.

At block 813, the anomaly detection model trainer deletes the current malicious traffic feature from the list of malicious traffic features. The list of malicious traffic features can be maintained in a content vulnerability database and can be dynamically updated based on false positive rates of deployed and/or tested anomaly detection models and according to other criteria. The anomaly detection model trainer can optionally update hyperparameters for the anomaly detection model based on the false positive rate determined at block 811 as well as a detection rate for the anomaly detection model to further reduce the false positive rate.

At block 815, the anomaly detection model trainer determines whether there is additional malicious traffic feature in the identified malicious traffic features. If an additional malicious traffic feature is present, operations return to block 803. Otherwise, operations proceed to block 817.

At block 817, the anomaly detection model trainer updates hyperparameters of the anomaly detection model and retrains the updated anomaly detection model on the updated set of malicious traffic features. Updating the hyperparameters can occur substantially similarly to the operations at block 805. The anomaly detection model trainer can use the false positive rates and detection rates for the anomaly detection models on the removed malicious traffic features to determine the extent of the hyperparameter updates. The updated set of malicious traffic features is the list of malicious traffic features with all the malicious traffic features removed as determined in the iterations at blocks 803, 805, 807, 809, 811, and 813.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 705, 709, 711, and 713 can be performed in parallel or concurrently across attack identifiers. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more computer-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more computer-readable medium(s) may be utilized. The computer-readable medium may be a computer-readable signal medium or a computer-readable storage medium. A computer-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device. A computer-readable storage medium is not a computer-readable signal medium.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

The program code/instructions may also be stored in a computer-readable medium that can direct a machine to function in a particular manner, such that the instructions stored in the computer-readable medium produce an article of manufacture including instructions which implement the function/act specified in the flowchart and/or block diagram block or blocks.

Figure 9:
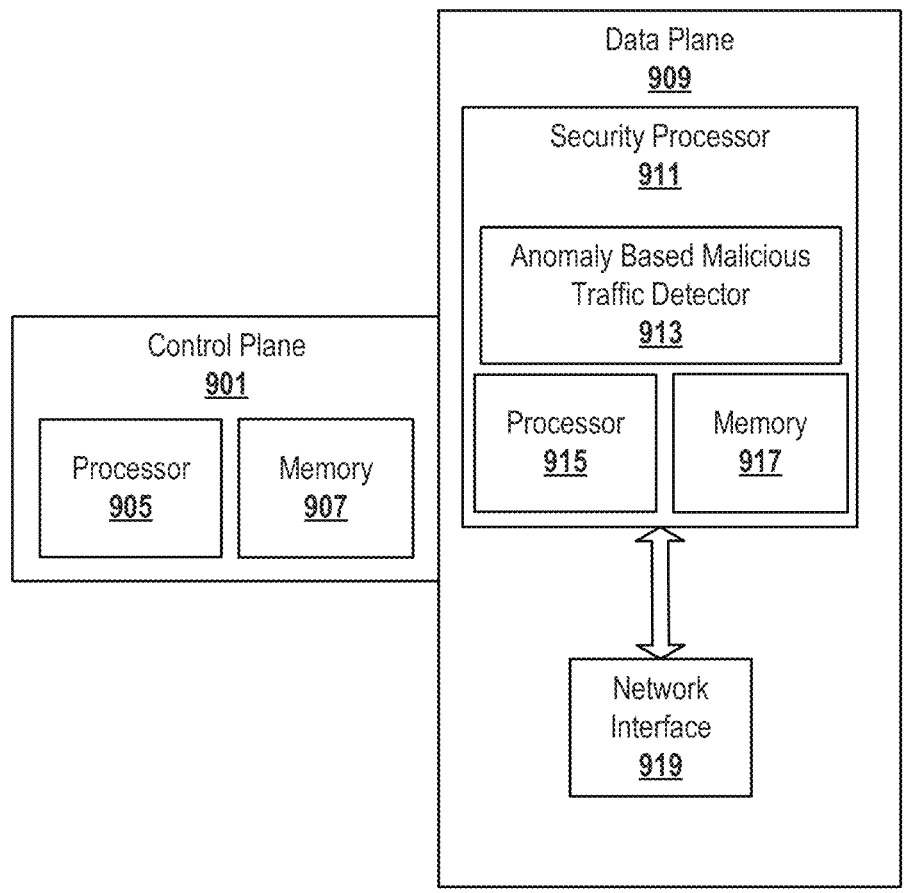
FIG. 9 depicts an example computer system with an anomaly-based malicious traffic detector.

FIG. 9 depicts an example system with an anomaly-based malicious traffic detector. The system includes a control plane 901 and a data plane 909. These can be logically distinct component or can be physically distinct (e.g. running on separate processors/memory). The control plane 901 comprises and processor 905 and memory 907 and is configured to update network policies such as static and dynamic routing protocols, log network information, etc. The data plane 909 (i.e. forwarding plane) comprises a security processor 911 that handles samples intercepted via a network interface 919. The security processor 911 comprises an anomaly-based malicious traffic detector 913, a processor 915, and memory 917. The system also includes an anomaly-based malicious traffic detector 913. The anomaly-based malicious traffic detector 913 can train, update, and implement anomaly detection models on malicious traffic samples to detect malicious traffic intercepted via the network interface 919 using feature vectors of malicious traffic features corresponding to human-readable ASCII substrings of the malicious traffic samples. The memory 907, 917 can be shared across the data plane 909 and control plane 901 and can be volatile (e.g., random-access) memory or non-volatile memory. The network interface 919 can comprise a processor(s) and network interface card(s) configured for route lookup, network processing, network address translation, etc.

While the aspects of the disclosure are described with reference to various implementations and exploitations, it will be understood that these aspects are illustrative and that the scope of the claims is not limited to them. In general, techniques for training, updating, and implementing anomaly detection models trained to detect malicious traffic on payloads from traffic sessions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:
parsing unstructured payloads of traffic of a network session to obtain a first plurality of strings;
determining a subset of the first plurality of strings as first features representing the traffic of the network session based, at least in part, on correlations of the first plurality of strings with a second plurality of strings previously identified as second features corresponding to known malicious traffic;
generating a feature vector based on the first features;
inputting the feature vector into an anomaly detection model, wherein the anomaly detection model was trained on feature vectors generated from unstructured payloads of known malicious traffic; and
based on the anomaly detection model classifying the feature vector as non-anomalous, indicating the traffic of the network session as malicious.

2. The method of claim 1, wherein generating the feature vector comprises:
determining a frequency of each of the first features correlated with the second features,
wherein generating the feature vector is based, at least partly, on the determined frequencies.

3. The method of claim 2, wherein generating the feature vector further comprises normalizing the determined frequencies.

4. The method of claim 1, further comprising determining the correlations between the first plurality of strings and the second plurality of strings.

5. The method of claim 4, wherein determining the correlations between the first and second pluralities of strings comprises determining matches between the first and second pluralities of strings.

6. The method of claim 5, wherein determining matches between the first and second pluralities of strings comprises determining sequences of matching strings.

7. The method of claim 1, wherein the anomaly detection model is a one-class support vector machine.

8. The method of claim 1 further comprising:
based on the parsing, detecting a first sequence of characters in the unstructured payloads that do not satisfy a set of criteria for string readability;
determining a first token to represent the first sequence of characters; and
indicating the first token instead of the first sequence of characters in a first of the plurality of strings.

9. The method of claim 1 further comprising accumulating the unstructured payloads from the traffic of the network session until an analysis criterion is satisfied.

10. A non-transitory, computer-readable medium having instructions stored thereon that are executable by a computing device to perform operations comprising:
generating a first plurality of feature vectors corresponding to a first plurality of unstructured payloads for known malicious traffic sessions;
training an anomaly detection model to detect malicious unstructured payloads based, at least in part, on the first plurality of feature vectors;
inputting a second plurality of feature vectors into the trained anomaly detection model; and
based, at least in part, on a false positive rate for the trained anomaly detection model on the second plurality of feature vectors satisfying a performance criterion, deploying the trained anomaly detection model for malicious traffic detection.

11. The computer-readable medium of claim 10, wherein each feature vector in the first plurality of feature vectors indicates a frequency of features from a malicious traffic session in the known malicious traffic sessions being correlated with known malicious features.

12. The computer-readable medium of claim 11, further comprising instructions executable on the computing device to generate the known malicious features based, at least in part, on traffic sessions previously identified as malicious.

13. The computer-readable medium of claim 12, wherein the instructions executable on the computing device to generate the known malicious features comprise instructions to search for longest common substrings in unstructured payloads for the traffic sessions previously identified as malicious.

14. The computer-readable medium of claim 11, further comprising instructions executable on the computing device to:
based, at least in part, on a false positive rate for the trained anomaly detection model on the second plurality of feature vectors failing a performance criterion, remove at least one feature from the known malicious features to generate updated known malicious features;
update the first plurality of feature vectors based, at least in part, on the updated known malicious features; and
retrain the anomaly detection model on the updated plurality of feature vectors.

15. The computer-readable medium of claim 10, further comprising instructions executable on the computing device to update parameters of the anomaly detection model based, at least in part, on the false positive rate for the trained anomaly detection model on the second plurality of feature vectors.

16. The computer-readable medium of claim 10, wherein the performance criterion comprises the false positive rate for the trained anomaly detection model on the second plurality of feature vectors being below a threshold false positive value.

17. An apparatus comprising:
a processor; and
a non-transitory computer-readable medium having instructions stored thereon that are executable by the processor to cause the apparatus to,
analyze sets of unstructured packets from traffic of a network session, wherein the instructions to analyze the sets of unstructured packets comprise instructions executable by the processor to cause the apparatus to, for each set of unstructured packets,
identify a first plurality of strings occurring within the set of unstructured packets for malicious traffic analysis;
determine which of the first plurality of strings to use as traffic features based, at least partly, on comparison with known malicious traffic features;
generate a feature vector based on those of the first plurality of strings determined to use as traffic features;
input the feature vector into an anomaly detection model, wherein the anomaly detection model was trained on feature vectors generated from unstructured payloads of known malicious traffic; and
indicate the traffic of the network session as malicious based on classification of a feature vector corresponding to at least one of the sets of unstructured packets as non-anomalous by the anomaly detection model.

18. The apparatus of claim 17, wherein the computer-readable medium further has instructions stored thereon that are executable by the processor to cause the apparatus to indicate each set of unstructured packets as unclassified based on the anomaly detection model classifying the corresponding feature vector as anomalous.

19. The apparatus of claim 17, wherein the instructions to analyze sets of unstructured packets from traffic of a network session comprise instructions executable by the processor to cause the apparatus to obtain the known malicious traffic features in response to a query indicating parameters corresponding to one or more characteristics of the network session.

20. The apparatus of claim 17, wherein the computer-readable medium further has instructions stored thereon that are executable by the processor to cause the apparatus to accumulate unstructured packets from the traffic of the network session until an analysis criterion is satisfied, wherein each set of unstructured packets corresponds to unstructured packets accumulated until the analysis criterion is satisfied.

* * * * *